United States Patent
Fessler et al.

(10) Patent No.: US 7,240,252 B1
(45) Date of Patent: *Jul. 3, 2007

(54) PULSE INTERFERENCE TESTING IN A CDMA COMMUNICATION SYSTEM

(75) Inventors: Braden Fessler, Lee's Summit, MO (US); Chris Hiesberger, Leawood, KS (US); Alex Tkatch, Kansas City, MO (US); John Cubine, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 357 days.

This patent is subject to a terminal disclaimer.

(21) Appl. No.: 10/883,251

(22) Filed: Jun. 30, 2004

(51) Int. Cl.
*G01R 31/28* (2006.01)
*G06F 11/00* (2006.01)
*H04B 17/00* (2006.01)

(52) U.S. Cl. .................... 714/712; 714/704; 455/67.13

(58) Field of Classification Search ............... None
See application file for complete search history.

(56) References Cited

U.S. PATENT DOCUMENTS

| | | | | |
|---|---|---|---|---|
| 5,815,507 | A * | 9/1998 | Vinggaard et al. | 714/704 |
| 5,959,984 | A * | 9/1999 | Dent | 370/347 |
| 6,741,659 | B1 * | 5/2004 | Chan et al. | 375/295 |

OTHER PUBLICATIONS

"Cell Phone Jammer—SH066PL2A/B", http://www.globalgadgetuk.com/Personal.htm, printed from World Wide Web on Jun. 29, 2004.
"Digital Cell Phone Jammers", http://www.spymodex.com/jammer.htm, printed from World Wide Web on Jun. 29, 2004.
"Coutner Surveillance", http://www.spystoreuk.com/csdetail.html, printed from World Wide Web on Jun. 29, 2004.
I. Mowete, "Cell Phone Detectors and Jammers", http://www.sunnewsonline.com/webpages/features/cybersun/2004/aug/30/cybersun-aug30-2004-006.htm, Aug. 30, 2004.
G. Mangamma et al., A Microprocessor-controlled Programmable Pulse Generator, appeared in J. Phys. E: Sci. Instrum. 20: pp. 100-101 (1987), received Jan. 3, 1986.
L.E. Miller, "Tutorial: Effects of Pulsed Interference", IEEE P802.15-03/504r0, Nov. 2003.
W.W. Ali-Ahmad, "The CDMA Receiver System in an IS-98-A Standard", Electronics Engineer, Jul. 2000.

* cited by examiner

*Primary Examiner*—Christine T. Tu

(57) ABSTRACT

Inducing desired frame error patterns and rates in a CDMA wireless communication channel. The induced frame errors may be used to test a digital radio receiver's behavior in the presence of frame errors. Preferred methods include providing a carrier signal having at least one data channel, where the data channel has a plurality of data frames; generating discrete noise bursts of radio frequency noise, where the noise bursts have a duration characteristic and an interval characteristic; and, combining the noise bursts and the carrier signal to induce a desired frame error characteristic.

23 Claims, 4 Drawing Sheets

PULSE INTERFERENCE TESTING IN A CDMA COMMUNICATION SYSTEM

BACKGROUND

A. Field of Invention

The present invention is related to wireless communication systems, and more particularly, to a method and system of controlling forward frame error rates and frame error patterns in a CDMA mobile test setup. It is particularly useful in evaluating a mobile station's vocoder response to specified frame error rates and frame error patterns.

B. Description of Related Art

Voice coders, or "vocoders," (or codecs) are used to convert voice signals into digital data packets or data streams that may then be transmitted over a digital data communication channel. In a typical wireless phone or data service, such as the widely used CDMA and GSM cellular phone systems, vocoders are designed using various speech coding algorithms (e.g., RCELP (relaxed code-excited linear predictive coding), ACELP (algebraic code excited linear prediction), etc.) which have been standardized in the CDMA networks (EVRC (enhanced variable rate coder, as described in IS-127), Q13 (as described in IS-733), and SMV (selectable mode vocoder, currently under development)) and GSM networks (EFR (enhanced full rate), AMR (adaptive multi-rate)). The performance of the vocoder is rated in terms of how well the vocoder reproduces the analog voice-band signal. Typical rating systems used in the wireless communication industry include Perceived Equivalent Speech Quality (PESQ), as further defined in ITU specification P.862, Mean Opinion Score (MOS), as further defined in ITU specification P.80, and Perceptual Analysis Measurements System (PAMS) developed by British Telecom, which are objective standardized methods of voice quality scoring. In addition, TTY coder performance may be evaluated using a character error rate.

Vocoder performance evaluations also take into account how well the vocoder performs in the presence of errors caused by the communication channel. In a typical wireless communication system, the communication channel that is the source of most of the impairments is between a base transceiver station (BTS) and a mobile subscriber unit, such as a cell phone. Typically, the errors in a wireless system are caused by various channel impairments such as additive noise, power fluctuations (most commonly due to Raleigh fading), radio interference, frequency response variations, nonlinearities, etc. The wireless communication system utilizes error control coding to detect and correct errors within the data frames, but the ability to correct errors is limited. In the event the error correcting capacity of the code is exceeded, the entire data frame is marked as an error and is discarded. This is referred to as a frame error, and the number of frame errors compared to the total number of frames is referred to as the frame error rate.

Numerous test configurations and procedures have been specified by various standards organizations. These traditional methods of measuring vocoder performance, as described in various CDMA Standard test documents, typically use a complex Raleigh fading channel model and converter to closely model the channel characteristics. The Raleigh fader model is designed to check the base station and mobile ability to use forward power control to control the frame error rate (FER) at a low set point in the presence of fading. This testing model, however, has limitations in its use for determining characteristic behaviors of radios in the presence of frame error excursions beyond the low set point.

Consequently, a test configuration that allows more precise control of frame error rates and frame error patterns that overcomes the current limitations is needed.

SUMMARY

A method of inducing desired frame error patterns and rates in a CDMA wireless communication channel is provided. The induced frame errors may be used to test a digital radio receiver's behavior in the presence of frame errors. In particular, the pulse interference generator is useful in checking a mobile station's ability to handle abnormal frame error excursions beyond a low set point. Such excursions may occur in typical wireless systems, and may cause voice quality or TTY character accuracy to degrade.

Preferred methods of providing a desired frame error characteristic include providing a carrier signal having at least one data channel, where the data channel has a plurality of data frames; generating discrete noise bursts of radio frequency noise, where the noise bursts have a duration characteristic and an interval characteristic; and, combining the noise bursts and the carrier signal to induce a desired frame error characteristic. The noise bursts may be generated by gating a noise source using a pulse train signal. The duration characteristic and the interval characteristic of the pulse train signal induce the duration characteristic and interval characteristic of the noise bursts. The individual noise bursts are of sufficient duration to be coincident with, or overlap in time, a predetermined number of frames, such as one, two, three, or more frames, depending on the type of testing desired.

The pulse train signal is preferably provided by a programmable function generator, but a standard waveform generator may also be used. Preferably, the duration characteristic and interval characteristic are configurable, thereby allowing more flexibility in the test setup and configuration. The pulses, (and therefore the noise bursts) may be asynchronous or synchronous with the data frames. The frame error characteristic may be a frame error pattern, a frame error rate, or a combination of the two. The desired frame error characteristic is preferably configurable by selecting one of a plurality of predetermined frame error characteristics. Again, the predetermined frame error characteristics may be a frame error pattern, a frame error rate, or a combination of the two.

The frame error patterns may consist of a series of pulses with a constant interval between the pulses, or the interval may be variable in a controlled manner, e.g., in a pseudo random or random fashion, where the probability distribution characteristics are selectable. Similarly, the duration of the pulses may be constant, or the duration may be variable in a controlled manner, e.g., in a pseudo random or random fashion, where the probability distribution characteristics are selectable. The duration characteristic is preferably controlled to have a time duration sufficient for the pulse to be coincident with a predetermined number of frames. The combined signal may then be provided to a mobile unit under test, and the vocoder performance may be evaluated.

The test apparatus for providing a desired frame error characteristic preferably includes a signal combiner having a first combiner input, a second combiner input, and a combiner output; a noise generator for providing a noise signal; a pulse generator for providing a gating signal having a duration characteristic and an interval characteristic; a radio frequency switch having a switch input connected to the noise generator, a switch output connected to the first combiner input, and a control input coupled to the pulse generator for selectively coupling the switch input to the switch output to provide a noise burst signal; and a data source coupled to the second combiner input for providing a carrier signal having at least one data channel having a plurality of data frames; wherein the combiner output provides a combined carrier signal and burst noise signal.

In certain preferred embodiments, the pulse generator is programmable, and may provide pulses wherein the duration characteristic is a duration sufficient for the pulse to be coincident with a predetermined number of frames.

In certain preferred embodiments, the pulses may be asynchronous, but in alternative embodiments, the data source provides a frame synchronization signal to the pulse generator so that it can produce a gating signal that is synchronous with the data frames contained in the carrier signal.

These as well as other features and advantages of the present invention will become apparent to those of ordinary skill in the art by reading the following detailed description, with appropriate reference to the accompanying drawings.

BRIEF DESCRIPTION OF FIGURES

Reference is made to the attached drawings, wherein elements that have the same reference numeral designations represent like elements throughout and wherein.

DETAILED DESCRIPTION OF EXEMPLARY EMBODIMENTS

Figure 1:
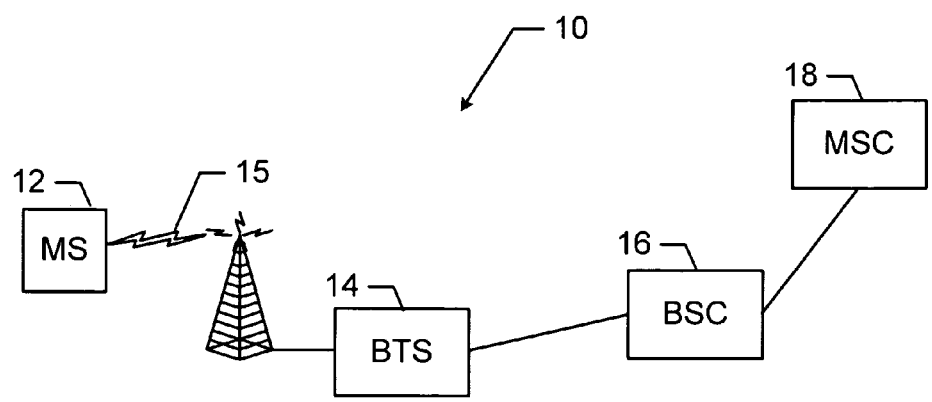
FIG. 1 is a block diagram illustrating one embodiment of a wireless communication system.

A typical wireless communication system 10 is shown in FIG. 1. Mobile station 12 communicates with the mobile switching center 18 (MSC) via base transceiver station 14 (BTS), radio air interface 15, and base station controller 16 (BSC). The format of the radio signal consists of data frames, where each frame typically carries a block of vocoder payload information. In a CDMA system, frames from multiple users are separated by the patterns of ones and zeros used to represent the data, and may therefore be transmitted at the same time and frequency. Noise or other channel impairments associated with the radio air interface 15 may corrupt the data, resulting in data errors. Each data frame is protected using error correcting codes that provide a mechanism to detect and correct a certain number of errors. In the forward link, a combination of CRC (cyclic redundancy check) and convolutional encoding is used to detect and correct errors in data frame. In the event the errors cannot be corrected, the entire data frame is discarded. This is referred to as a frame error.

Figure 2:
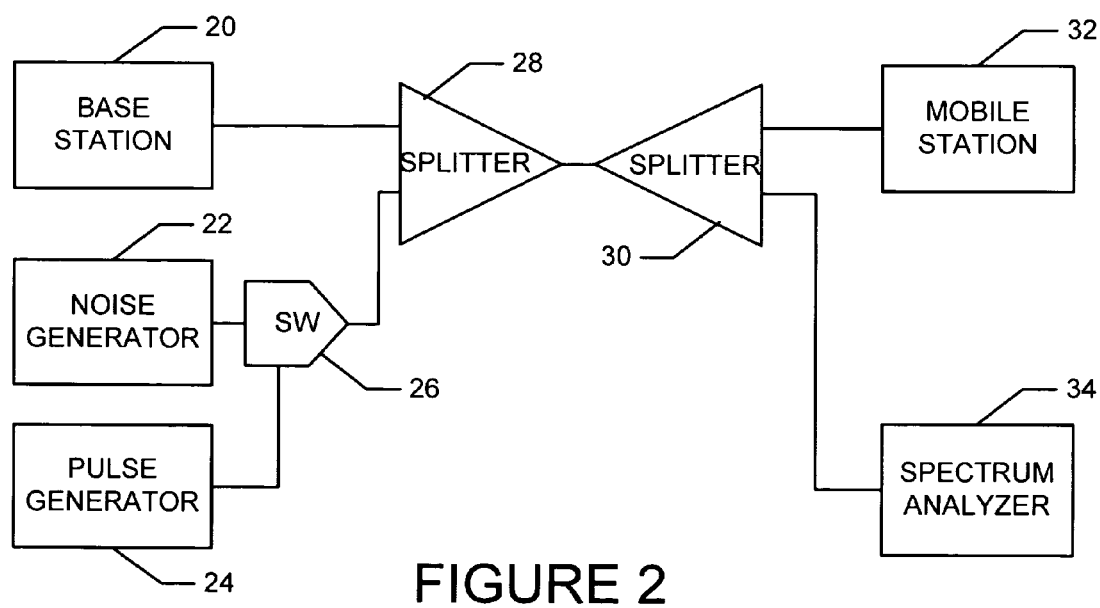
FIG. 2 illustrates a preferred test system architecture.

As shown in FIG. 2, a preferred pulse interference test apparatus for providing a desired frame error characteristic preferably includes a data source 20, a noise generator 22, a pulse generator 24, a radio frequency switch 26, and a signal combiner 28.

The data source 20 may be a base transceiver station (BTS) or a BTS simulator. One suitable simulator device is an Agilent 8960 Wireless Communication Test Set. The data source provides a carrier signal having at least one data channel having a plurality of data frames. In an alternative embodiment, the data source may be an active base station.

In this embodiment, the antenna may be used to obtain a carrier signal having a forward channel. As the mobile reports back certain FER rates or requests more power due to low Eb/No values, the active base station may provide more power as a result of the inner and/or outer loop power control algorithms. However, the level of interference is such that the desired FER rate will be achievable even when the forward channel power level is increased.

The noise generator may generate narrow band noise or interference such as a CW (continuous wave) signal, or broadband noise or interference, such as broadband additive white Gaussian noise. When added to the carrier data signal, the noise or interference must be sufficient to thwart the receiver's ability to recover a data frame. That is, the magnitude of the CW signal or the broadband noise must be sufficiently high. In a preferred embodiment, to assure complete interference resulting in a frame error, the following setup was used: (i) the CDMA signal-to-noise ratio of the forward link (forward traffic channel) of the base station simulator 20 is set relatively close to the threshold of the demodulation limit of a typical mobile, e.g. $Eb/Nt=6.5$ dB; (ii) the noise generator 22 (in this case a CW interference generator) power is set to 15 dB higher than the total received signal (CDMA+AWGN) power as measured at the mobile station 32; and (iii) the RF switch 22 isolation is at least 20 dB. Devices suitable for generating a noise signal are the Spirent TAS4600 and the Hewlett Packard HP8648C CW generator.

Pulse generator 24 is used to generate a gating signal that is used to gate the noise signal. The gating signal is preferably a pulse train, where the pulse waveform is characterized by a duration characteristic and an interval characteristic. The duration characteristic is the time for which the pulse amplitude is high (or at a voltage that provides an "on" signal to the switch 26). The interval characteristic is the time between pulses. By setting the duration characteristic and the interval characteristic, the system may be configured to provide a noise signal that corrupts a desired number of consecutive frames with a desired number of good frames in between. A suitable pulse generator for providing the gating signal is an HP8904A programmed in binary sequence, or HP 8160A. Alternatively, the pulses may be generated by a personal computer 42 containing a simple program to provide output pulses on an RS-232 port or other similar interface, as shown in FIG. 3.

The pulse train signal may have a predetermined pattern, such as one pulse having a three-frame duration, followed by an interval that is fifty frames long, followed by a pulse having a four-frame duration, and an interval that is forty three frames long, and then repeating that pattern. Preferably, any arbitrary pattern that is desired may be programmed into the pulse generator.

In an alternative embodiment, the pattern may be randomized such that the pulse duration characteristic, the pulse interval characteristic, or both, may be random. For example, one pulse pattern may be specified to be a constant interval of fifty frames, with a randomized pulse duration of either two or three consecutive frames. Preferably the distribution function is uniform over the range, making the pulse widths of two or three frames equally likely to occur. In other embodiments, other probability distributions may be selected. As another example, the pulse duration may be fixed at, e.g., three frames, while the interval may be a randomized integer number of frames between, e.g., thirty and thirty five. In other embodiments, both the duration and interval may be randomized.

Figure 3:
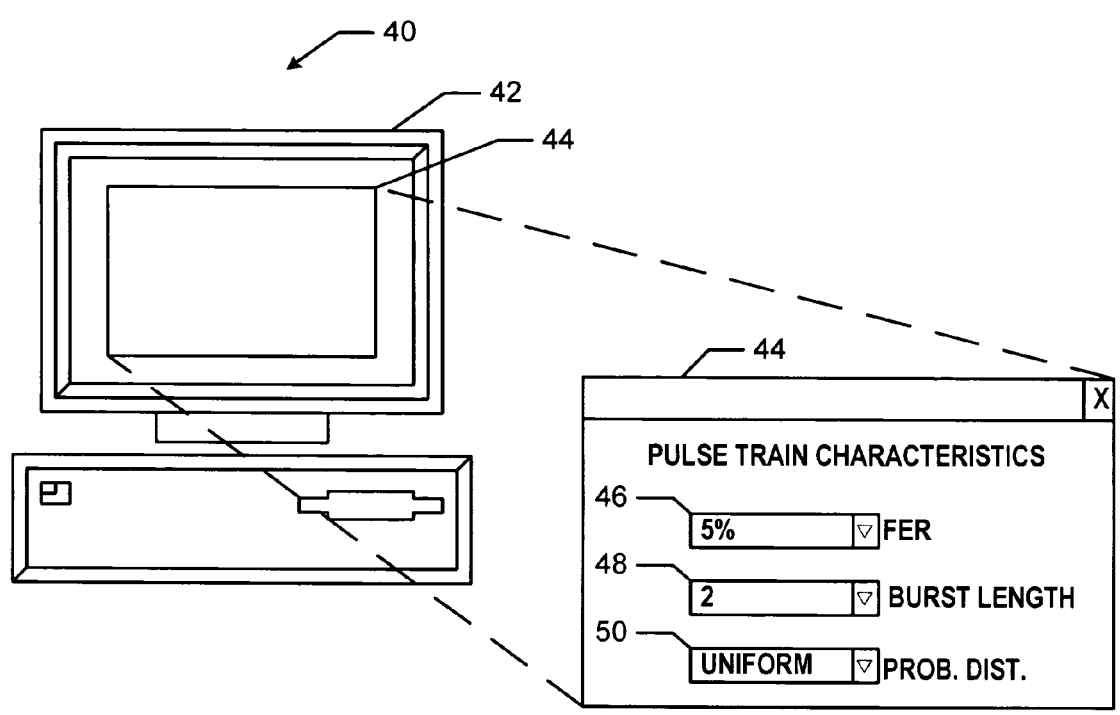
FIG. 3 illustrates a preferred pulse generator.

In a preferred embodiment shown in FIG. 3, the user is presented with a graphical user interface 44 (GUI) on the pulse generator 40 that allows the user to select one of a number of predetermined pulse patterns that may be used to generate a corresponding desired frame error pattern and frame error rate. In one particular embodiment, the user selects a desired frame error rate (FER) by typing it into a data field or selecting it from a drop-down box 46 as shown, and selects a desired number of consecutive frame errors, or burst length, by again, typing it into a data field or selecting it from a drop-down box 48 as shown. The combination of the two parameters (FER and burst length) is then mapped to a pulse pattern having the required duration and interval characteristics. For example, if an FER of 5% is selected, and a burst length of three, then the pulse generator may provide a pulse train signal having a pulse duration of three frames and an interval of fifty seven frames. In another example, the GUI may provide for selection of a randomly distributed burst length of "one to two", "two to three", etc. If an FER of 5% is selected and burst length of "two to three" is selected, then the pulse generator may provide a pulse having a duration of either two or three frames (randomly, but equally likely), and an interval of forty seven frames. Other patterns may also be provided if the interval characteristic is not constant.

Radio frequency (RF) switch 26 may be a gated RF amplifier such as the Minicircuits ZYSWA-2-50DR. The switch includes a control input that accepts a TTL level input, whereby a five volt signal turns on the amplifier. Thus, when the control input is coupled to the pulse generator, it selectively couples the noise signal present at the switch input to the switch output to thereby provide a noise burst signal. The signal combiner 28 may be a two-way RF power splitter, such as the Minicircuits ZN2PD-1900W. The output of the switch is a noise burst signal, wherein the noise (i.e., noise or interference signal) is present when the pulses are high, and will not be present during the intervals between pulses. In this way, the duration and interval characteristics of the pulse train signal are used to provide or induce the duration and interval characteristics of the noise burst signal.

The combined carrier signal and burst noise signal are then provided to a unit under test, such as a mobile station 32, such as cellular phone (e.g., a Sanyo 4900). Additionally, the test configuration may optionally include a spectrum analyzer 34 for viewing the frequency content and/or interference pattern of the combined data and burst noise signals. In this case, an additional signal splitter/combiner 30 is used to provide the signal to the spectrum analyzer, such as an Agilent E4402B.

In certain preferred embodiments, the pulses may be asynchronous, but in alternative embodiments, the data source 20 provides a frame synchronization signal to the pulse generator 24 so that it can produce a gating signal to the RF switch 26 that is synchronous with the data frames contained in the carrier signal.

Figure 4:
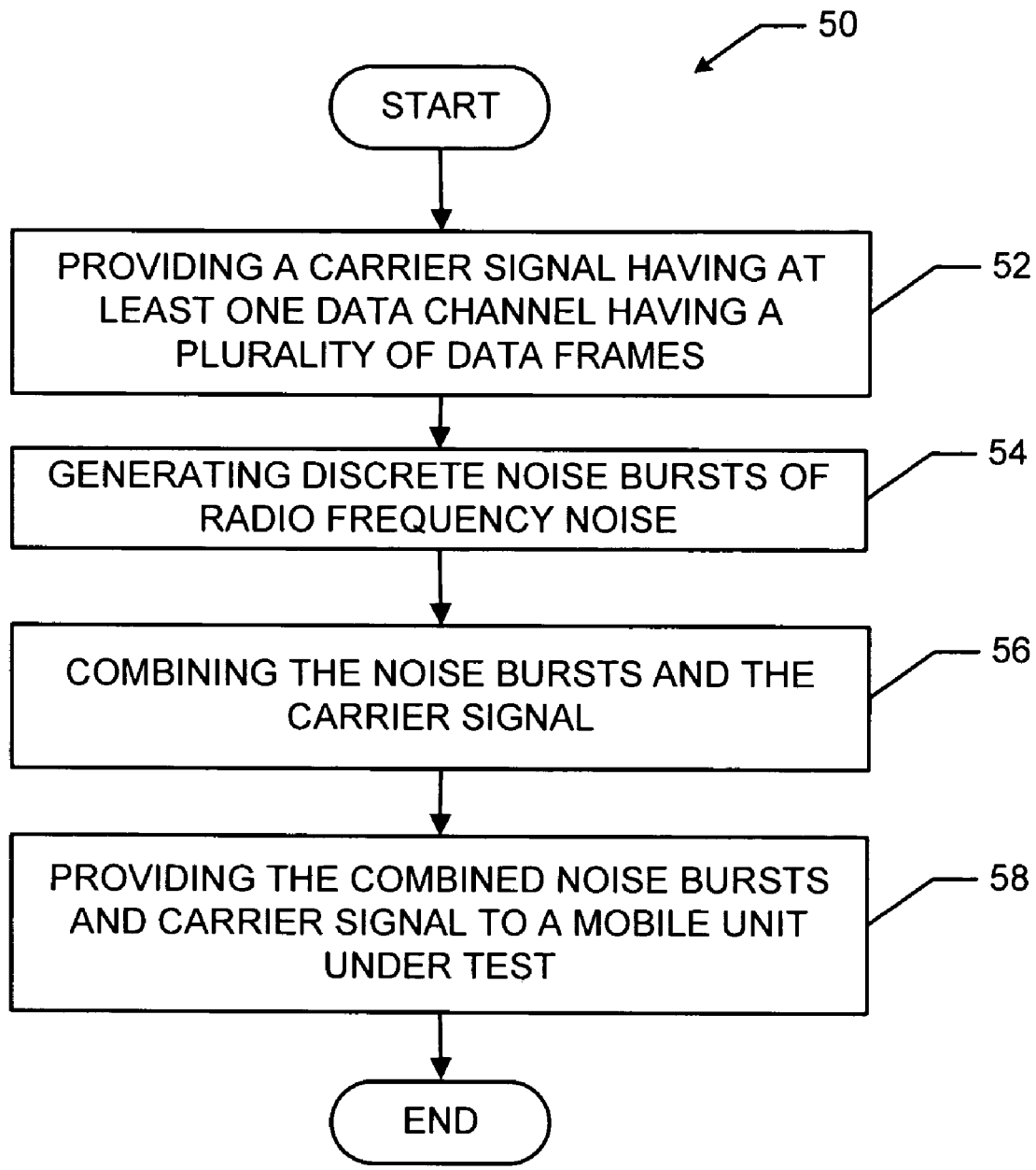
FIG. 4 illustrates a preferred testing method.

A preferred method 50 of providing a desired frame error characteristic is shown in FIG. 4. At step 52 a carrier signal is provided, where the carrier signal preferably has at least one data channel, and where the data channel has a plurality of data frames. At step 54, noise burst are generated where each discrete noise burst has a duration characteristic and an interval characteristic. At step 56, the noise bursts and the carrier signal are combined. This results in the receiver being unable to properly recover the frames that overlap, or which are coincident with the noise bursts, thereby inducing a desired frame error characteristic. As described above, the noise bursts may be generated by gating a noise source 22 using a pulse train signal from a pulse generator 24. The duration characteristic and the interval characteristic of the pulse train signal induce the duration characteristic and interval characteristic of the noise bursts. The frame error characteristic may be a frame error pattern, a frame error rate, or a combination of the two. The desired frame error characteristic is preferably configurable by selecting one of a plurality of predetermined frame error characteristics.

The individual noise bursts are of sufficient duration to be coincident with, or overlap in time, a predetermined number of frames, such as one, two, three, or more frames, depending on the type of testing desired. The pulses, (and therefore the noise bursts) may be asynchronous or synchronous with the data frames. Again, the predetermined frame error characteristics may be a frame error pattern, a frame error rate, or a combination of the two. At step 58, the combined signal may be provided to a mobile unit under test, and the vocoder performance may be evaluated.

In an alternative test procedure, the system may be operated such that there are no frame errors for a period of time, say ten seconds. The vocoder may be rated using a PESQ or PAMS score. One would expect a rating of four or five. Then the desired FER (and optionally a burst duration, or number of consecutive frames) is selected and translated into a duration characteristic and/or an interval characteristic. In some preferred embodiments, the FER rate may be verified: the forward frame erasures are reported by the mobile station 32 via the reverse RF link using Service Option 55, and are displayed on the base station simulator 20. Preferably, no forward power control is used in the base station simulator 20. The vocoder performance is then rated again using the PESQ or PAM scores, or in the case of TTY performance, the character error rate may be used.

The following table shows the correlation of induced FER to the duty cycle (the ratio of the pulse duration to the sum of the pulse duration and the interval) of the interfering pulses as measured. In an asynchronous configuration, judicious choice of interference pulse widths and repetition rates that are not correlated to the frame rate (20 ms frames @ 50 per second) ensures short averaging times (less than 3000 frames). Specific occurrences of 1 or 2 or 3 consecutive frame errors is easily controlled by the varying the interference pulse width.

TABLE 1

| Interference Pulse Width Sec | Time between Pulses (# of pulse widths between pulses) sec | Frame Error Rate percent | Duty Cycle of interference pulse percent | Consecutive Frame errors |
|---|---|---|---|---|
| .017 | .153 (9) | 11.0 | 11.1 | 1 or 2 |
| .017 | .187 (11) | 9.0 | 9.09 | 1 or 2 |
| .017 | .238 (14) | 7.1 | 7.14 | 1 or 2 |
| .017 | .289 (17) | 5.7 | 5.88 | 1 or 2 |
| .017 | .374 (22) | 4.5 | 4.54 | 1 or 2 |
| .017 | .459 (27) | 3.7 | 3.70 | 1 or 2 |
| .017 | .646 (38) | 2.7 | 2.63 | 1 or 2 |
| .031 | .279 (9) | 11.0 | 11.1 | 2 or 3 |
| .031 | .341 (11) | 9.2 | 9.09 | 2 or 3 |
| .031 | .465 (15) | 6.7 | 6.66 | 2 or 3 |
| .031 | .527 (17) | 5.8 | 5.88 | 2 or 3 |
| .031 | .589 (19) | 5.2 | 5.26 | 2 or 3 |
| .031 | .744 (24) | 4.2 | 4.16 | 2 or 3 |
| .031 | 1.02 (33) | 3.0 | 3.03 | 2 or 3 |
| .031 | 1.33 (43) | 2.3 | 2.32 | 2 or 3 |
| .031 | 1.58 (51) | 1.9 | 1.96 | 2 or 3 |
| .031 | 2.26 (73) | 1.4 | 1.36 | 2 or 3 |

Figure 5:
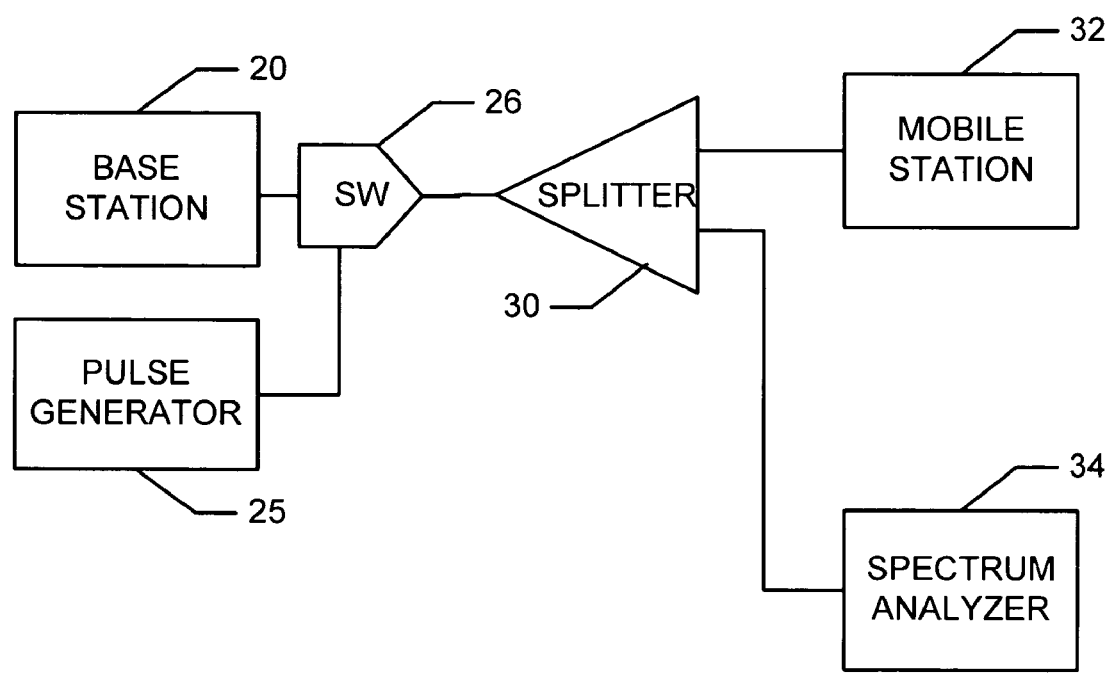
FIG. 5 illustrates an alternate preferred test system architecture.

With reference to FIG. 5, an alternative embodiment is shown where the data source 20 is itself gated directly through the switch 26. In this embodiment, the forward signal interference is provided by turning off the switch 26, thereby attenuating the carrier signal by up to 15 dB or 20 dB. In most cases, this amount of signal loss over the duration of the frame is sufficient to ensure a frame error. However, to ensure sufficient isolation, two or more switches may be connected in series to provide 30 dB (or 40 dB, depending on the isolation provided by each switch 26). The switches are controlled with the same pulse train signal to provide synchronous switching. In addition, the test may be configured to ensure that the power level of the forward channel is at or near the threshold required to provide a near zero FER rate when the switch 26 is turned on, but no higher. This helps to ensure that a moderate amount of isolation (e.g., 15 dB) is sufficient to induce a frame error when desired.

In addition, the embodiment of FIG. 5 imposes interference when the switch is off, as opposed to the embodiment of FIG. 2, which passes the interfering signal when the switch is on. Thus, the pulse generator 25 may operate exactly as described above with respect to pulse generator 25, with the exception that the output waveform is inverted. This may be accomplished by altering the pulse generator output, or simply inserting a signal inverter.

Those skilled in the art to which the present invention pertains may make modifications resulting in other embodiments employing principles of the present invention without departing from its spirit or characteristics. Accordingly, the described embodiments are to be considered in all respects only as illustrative, and not restrictive, and the scope of the present invention is, therefore, indicated by the appended claims rather than by the foregoing description. Consequently, while the present invention has been described with reference to particular embodiments, modifications apparent to those skilled in the art would still fall within the scope of the invention.

We claim:

1. A method of providing a desired frame error characteristic comprising the steps of:
   providing a carrier signal having a plurality of data frames;
   generating discrete noise bursts of radio frequency noise, wherein the noise bursts have a duration characteristic and an interval characteristic; and,
   combining the noise bursts and the carrier signal to induce a desired frame error characteristic.

2. The method of claim 1 wherein the step of generating noise bursts comprises gating a noise source using a pulse train signal.

3. The method of claim 2 wherein the pulse train signal has a duration characteristic and an interval characteristic that induce the duration characteristic and interval characteristic of the noise bursts.

4. The method of claim 1 wherein the duration characteristic of the noise bursts is configured to provide individual noise bursts of sufficient duration to be coincident with a predetermined number of frames.

5. The method of claim 1 wherein the pulse train signal is provided by a programmable function generator.

6. The method of claim 1 wherein the duration characteristic and interval characteristic are configurable.

7. The method of claim 1 wherein the noise bursts are synchronous with the data frames.

8. The method of claim 1 wherein the noise bursts are asynchronous with the data frames.

9. The method of claim 1 wherein the frame error characteristic comprises a frame error pattern.

10. The method of claim 1 wherein the frame error characteristic comprises a frame error rate.

11. The method of claim 1 wherein the frame error characteristic is configurable by selecting one of a plurality of predetermined frame error characteristics.

12. The method of claim 11 wherein each of the plurality of predetermined frame error characteristics includes a predetermined frame error rate.

13. The method of claim 11 wherein each of the plurality of predetermined frame error characteristics includes a predetermined frame error pattern.

14. The method of claim 1 further comprising the step of providing the combined noise bursts and carrier signal to a mobile unit under test.

15. The method of claim 1 wherein the interval characteristic is constant.

16. The method of claim 1 wherein the duration characteristic is a time duration sufficient for the pulse to be coincident with a predetermined number of frames.

17. An apparatus for providing a desired frame error characteristic, comprising:
   a signal combiner having a first combiner input, a second combiner input, and a combiner output;
   a noise generator for providing a noise signal;
   a pulse generator for providing a gating signal having a duration characteristic and an interval characteristic;
   a radio frequency switch having a switch input connected to the noise generator, a switch output connected to the first combiner input, and a control input coupled to the pulse generator for selectively coupling the switch input to the switch output to provide a noise burst signal; and
   a data source coupled to the second combiner input for providing a carrier signal having a plurality of data frames;
   wherein the combiner output provides a combined carrier signal and burst noise signal.

18. The apparatus of claim 17 wherein the pulse generator is programmable.

19. The apparatus of claim 17 wherein the duration characteristic is a time duration sufficient for the pulse to be coincident with a predetermined number of frames.

20. The apparatus of claim 17 wherein the data source provides a frame synchronization signal to the pulse generator, and wherein the gating signal is synchronous with the frame synchronous signal.

21. A method of providing a desired frame error characteristic comprising the steps of:
   providing a carrier signal having a plurality of data frames;
   gating the carrier signal using a pulse train signal applied to a gating device to induce a desired frame error characteristic; and,
   providing the gated carrier signal to mobile unit under test.

22. The method of claim 21 wherein the pulse train signal has a duration characteristic and an interval characteristic that induce a frame error duration characteristic and interval characteristic.

23. The method of claim 21 wherein the carrier signal undergoes a loss of at least 15 dB when the gating device is off.

* * * * *